United States Patent
Fabritius et al.

(10) Patent No.: US 6,345,182 B1
(45) Date of Patent: Feb. 5, 2002

(54) CHARGING IN A TELECOMMUNICATIONS SYSTEM

(75) Inventors: Mirka Elisa Fabritius; Mia Lucia Gustafsson, both of Helsinki (FI); Timo Suihko, Aachen (DE); Satu Simonen, Helsinki (FI); Kyösti Toivanen, Kirkkonummi (FI); Keijo Laiho, Masala (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/377,620

(22) Filed: Aug. 19, 1999

(30) Foreign Application Priority Data

Aug. 21, 1998 (FI) .................................................. 981797

(51) Int. Cl.[7] .............................................. H04Q 7/20
(52) U.S. Cl. ........................................ 455/408; 455/406
(58) Field of Search ............................... 455/408, 405, 455/406, 432, 560; 379/114.28, 114.29, 115.01, 115.02, 115.03

(56) References Cited

U.S. PATENT DOCUMENTS 5,511,113 A    4/1996  Tasaki et al.
6,018,652 A  * 1/2000  Frager et al. ................ 455/406
6,044,261 A  * 3/2000  Kazmi ........................ 455/408

FOREIGN PATENT DOCUMENTS

| DE | 195 15 418 A1 | 10/1996 |
| WO | 94/28670 | 12/1994 |
| WO | 96/20571 | 7/1996 |

* cited by examiner

Primary Examiner—Lee Nguyen
(74) Attorney, Agent, or Firm—Nixon & Vanderhye, P.C.

(57) ABSTRACT

A method of charging at a mobile switching centre, MSC (5) of a mobile telecommunications network (2) in respect of a call initiated by a mobile terminal (1) registered with the network (2) and terminating outside of the network. At the MSC (5) the call is classified, according to the associated A-number and/or the B-number, as corresponding either to a call for which the MSC (5) is to be the charge determination point or to a call for which the charge determination point is located outside of the mobile telecommunications network (2). In the event that the call belongs to the latter class, the MSC (5) receives tariff information from the external charge determination point (7,9) and calculates charge information on the basis of the received tariff information. In the event that the call belongs to the former class, the MSC (5) disregards any tariff information received from an external charge determination point and calculates charge information on the basis of the mobile telecommunications network's own tariff information.

12 Claims, 1 Drawing Sheet

CHARGING IN A TELECOMMUNICATIONS SYSTEM

FIELD OF THE INVENTION

Figure 1:
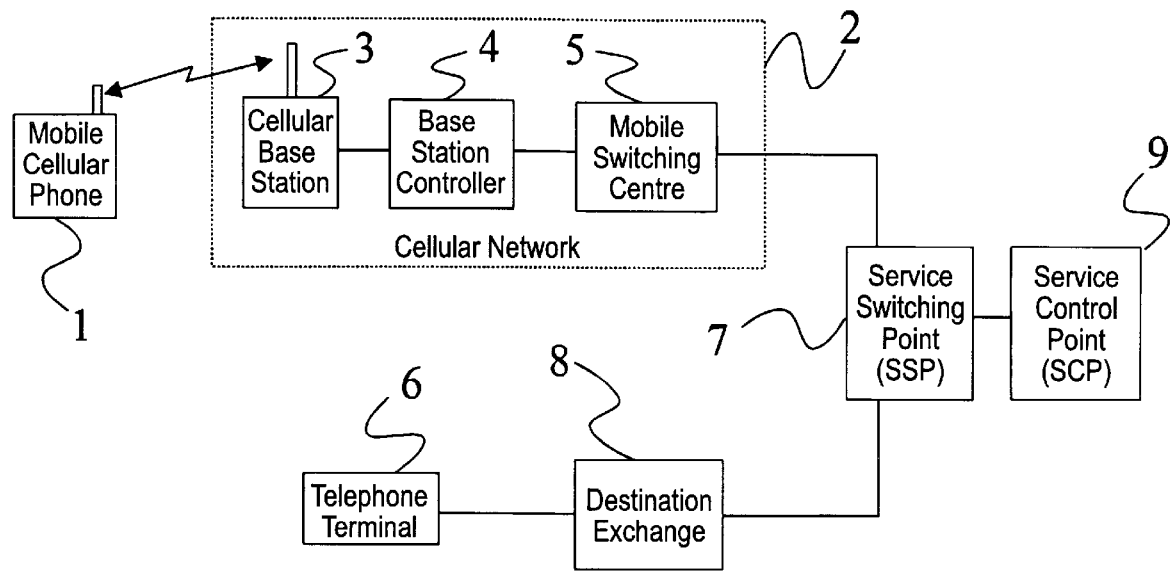

The present invention relates to charging in a telecommunications system and more particularly, though not necessarily, to charging in a system in which a mobile terminal is connected through a mobile switching centre to make use of a service facilitated by an intelligent network.

BACKGROUND OF THE INVENTION

As the number of exchanges in modern telecommunications networks has increased, there has been a tendency to centralize supplementary services (including call diversion, toll-free number access, premium rate number access, etc.) in certain specialized network nodes. Typically, these nodes are directly associated with only a relatively small number of exchanges. Callers requiring access to the supplementary services, but who are not directly connected to an exchange providing the service, are routed to a suitable exchange via their local exchange and possibly one or more transit exchanges. This technique of centralizing supplementary services is often referred to as "Intelligent Networks".

In modern telecommunications networks, a node for detecting calls to an IN service is often referred to as a Service Switching Point (SSP). After detection of a call, an SSP communicates with a node having particular knowledge (e.g. a terminating B-number) of the IN service, termed the Service Control Point (SCP), to obtain information on how the connection is to be set up. Communication between the SSP and the SCP often makes use of (or is based upon) a standardized interface protocol known as ETSI CS1 (ETSI: ETS 300 374-1: see also ITU-T recommendations Q1218 1993 & 1995).

It will be appreciated that a caller (being allocated some A-number) will often be charged for making use of an IN service. For example, if a caller places a call to a premium rate number (e.g. a sports hotline) then he will be charged at some appropriate tariff. One function therefore of the SSP is to return to the SCP information which enables the SCP to determine if the accessed IN service is chargeable and, if so, the appropriate tariff. This information is normally provided to the SCP by the SSP following the termination of a call. This use of so-called "flexible charging" may be applied more generally in telecommunications systems and is described in more detail in ICBS (Interconnection Charge Billing System) published by the Interconnection Charge Billing Forum, Tokyo, Japan.

There is currently a desire to be able to provide real time charging information to network operators and indeed to network users. This is particularly true in the case of mobile telephone users where much of the necessary technology is already in place, e.g. mobile telephones usually have a liquid crystal display on which real time charging information can be displayed.

The Japanese ARIB standard RCR STD-27x provides for charging information services known as Advice of Charge (AoC). The AoC service offers the possibility of informing a mobile terminal of the charge for a call originated by the terminal. Charge information is sent to the terminal upon release of the call. TTC JJ-70.10 also defines a so-called Inter-Network Charge Information Transmission (INCIT) functionality which provides for the exchange of certain call-related charging information between so-called visited and home networks. One further service which is available in some networks (although not yet standardized) is known as Charge Rate Information (ChRI). ChRI provides a charging notification element (containing charging information and a charge rate) to an originating terminal, either during call set-up or during the call itself, which allows the terminal to calculate the call cost.

In mobile telephone networks, telephone calls and associated signalling information are routed through a Mobile Switching Centre (MSC) which is analogous to a conventional telephone exchange. One of the functions of the MSC is to collect charging information on individual calls and to record that information for later billing. It is already possible to provide certain real time billing information to mobile subscribers based upon the data recorded at the MSC. However, this information relates only to basic call charges which can be calculated by the MSC based upon the location of the caller and of the called party. There exists no mechanism by which additional tariff information relating to an accessed IN service can be communicated to an originating MSC from an SSP/SCP node controlling the IN service. The same limitation applies to the general communication of tariff information across network boundaries, e.g. where operators have a cross-billing arrangement.

SUMMARY OF THE PRESENT INVENTION

An object of certain aspects of the present invention is to overcome or at least mitigate the above noted disadvantage of existing telecommunications networks. In particular, it is an object to provide for the communication of tariff information from an external charge determination point to a mobile switching centre acting as charging point for a call originating mobile terminal, depending upon the classification of the call.

According to a first aspect of the present invention there is provided a method of determining charging information at a mobile switching centre of a mobile telecommunications network in respect of a call initiated by a mobile terminal registered with the network and terminating outside of the mobile switching centre, the method comprising, at the mobile switching centre:

classifying said call according to the associated A-number and/or the B-number as corresponding either to a call for which the mobile switching centre is to be the charge determination point or to a call for which an external node is to be the charge determination;

in the event that the call belongs to the latter class, receiving tariff information from the external charge determination point and calculating charge information on the basis of the received tariff information; and in the event that the call belongs to the former class, disregarding any tariff information received from an external charge determination point and calculating charge information on the basis of the mobile telecommunications network's own tariff information.

Preferably, in the event that the call belongs to the class for which the charge determination point is located outside of the mobile switching centre, a Request for Charge Information is sent by the mobile switching centre to the external charge determination point. More preferably, this request is sent as a flag contained in an Initial Address Message, transmitted as part of the call set-up phase.

Preferably, said tariff information comprises a Charge Information (CI) parameter, giving a call unit rate (or a set of call unit rates), and a Charge Information Type (CIT) parameter, indicating whether or not the CI parameter provides flexible charging information.

Preferably, the class of calls for which the charge determination point is located outside of the mobile switching centre, includes calls having A or B-numbers associated with Intelligent Network Services. More preferably, for such calls, the method comprises the steps of:

directing a request for access to the Intelligent Network service from the mobile switching centre to a service switching point of the system, together with a request for charging information, both of said requests being contained within an Initial Address Message sent as part of a call set-up routine;

in response to receipt of said Initial Address Message containing said request for charging information at the service switching point, sending a charging indicator request from the service switching point to a service control point having knowledge of the requested service;

in response to receipt of said charging indicator request at the service control point, sending a tariff indicator associated with the requested service from the service control point to the service switching point; and determining at the service switching point, charging parameters on the basis of at least the received tariff indicator, and sending said charging parameters to said mobile switching centre.

Embodiments of the present invention enable IN service related charging information to be delivered from an IN service access node to a mobile switching centre. A mobile switching centre is therefore able to deliver accurate charging information to a calling mobile terminal, or to other components of the telecommunications system. The IN service access node may be located either in the mobile network or in a foreign network.

Preferably, said charging parameters are sent from the service switching point to the mobile switching centre during the call set-up routine. More preferably, said charging parameters are included in an address complete message (or an early address complete message). Preferably, the charging parameters determined at the service switching point are a charge information parameter and a charge information type parameter.

Preferably, communications between the service switching point and the service control point are based upon the ETSI CS1 protocol. Said charging indicator request is then sent from the service switching point to the service control point as a flexible charging indicator parameter contained in an InitialDP message. The tariff indicator may be returned in response as a parameter contained within the SendCharginInformation (SCI) message. More preferably, determination of said charging parameters at the service switching point is triggered by the subsequent receipt thereat of a message, sent from the service control point, containing a flexible charge request indicator.

Preferably, said charge information calculated by the mobile switching centre is employed either for AoC, ChRI, or INCIT service.

According to a second aspect of the present invention there is provided apparatus for determining charging information at a mobile switching centre of a mobile telecommunications network in respect of a call initiated by a mobile terminal-registered with the network and terminating outside of the mobile switching centre, the apparatus comprising, at the mobile switching centre:

classification means for classifying said call according to the associated A-number and/or the B-number as corresponding either to a call for which the mobile switching centre is to be the charge determination point or to a call for which the charge determination point is located outside of the mobile switching centre;

first processing means arranged, in the event that the call belongs to the latter class, to receive tariff information from the external charge determination point and calculating charge information on the basis of the received tariff information, or, in the event that the call belongs to the former class, to disregard any tariff information received from an external charge determination point and to calculate charge information on the basis of the mobile telecommunications network's own tariff information.

DETAILED DESCRIPTION OF CERTAIN EMBODIMENTS

Figure 2:
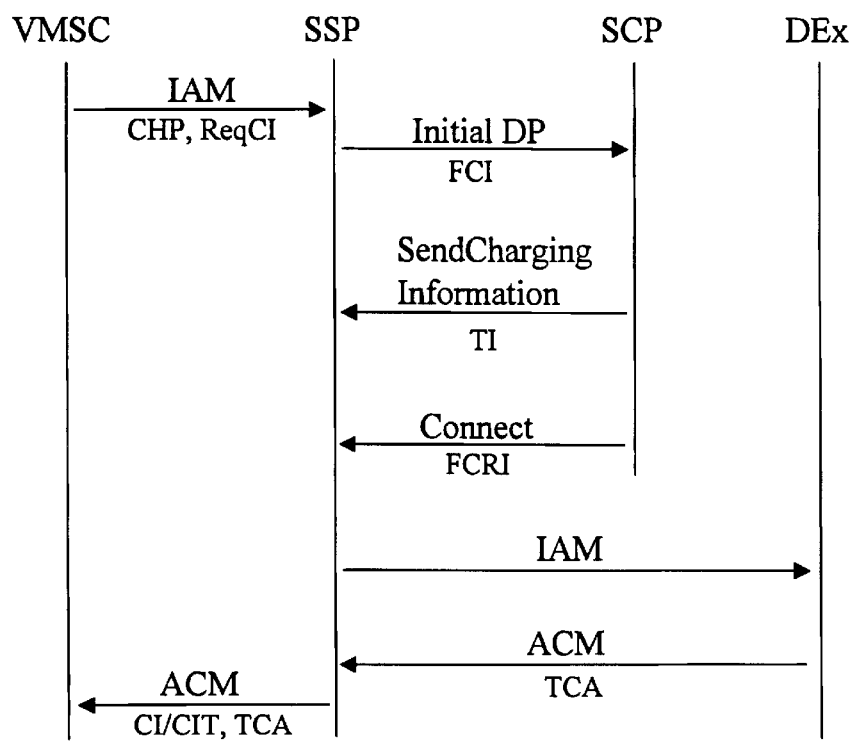

For a better understanding of the present invention and in order to show how the same may be carried into effect reference will now be made, by way of example, to the accompanying drawings, in which:

FIG. 1 illustrates schematically a telecommunications system connecting an originating mobile terminal to a terminating terminal; and FIG. 2 illustrates signalling over a portion of the system of FIG. 1 during a call set-up phase.

The invention is exemplified below with reference to certain Japanese TTC standards. However, it will be understood that the invention is also applicable to other telecommunications standards.

In FIG. 1, a mobile cellular telephone is indicated by reference numeral 1. The terminal 1 is assumed to be registered with a cellular network 2, with signalling and call traffic being routed through cellular base station 3, a base station controller 4, and a mobile switching centre 5. This particular mobile switching centre 5 is referred to hereinafter as the Visited mobile switching centre (VMSC). For calls originating from the mobile telephone 1, the charging point is the VMSC 5.

Assume that the mobile telephone 1 initiates a call by dialing a certain telephone number. Assume further that the dialed number is associated with some Intelligent Network IN service such as a premium rate information line (e.g. providing sports information). The IN nature of the call may be indicated by the number prefix, e.g. 0800, referred to as an "IN-prefix". The call termination point will be a telephone terminal 6 provided with automatic answering and message playback facility. A traffic channel is established through the telecommunications network between the mobile terminal 1 and the telephone terminal 6 during an initial set-up phase. This process involves the transfer of signalling information between network exchanges (5,7,8) based upon the Signalling System No. 7 (TTC standards JT-Q761-4 and JT-Q766).

The set-up commences with the sending of an Initial Address Message (IAM) from the VMSC 5 to a Service Switching Point (SSP) 7 identified by the dialed number prefix, assuming that the SSP 7 is directly connected to the VMSC 5 as is illustrated in FIG. 1. The IAM comprises a number of parameters required to establish a traffic channel between the VMSC 5 and the terminating telephone terminal 6, via the SSP 7.

The SSP 7 contains the intelligence necessary to identify the placed call as a call associated with an IN service. Therefore, upon receipt of the IAM, the SSP 7 communicates with a Service Control Point (SCP) 9 associated with SSP 7, to establish further details concerning the IN service. These details may include the destination number (B-number) for the call, in which case the SSP 7 relays the received IAM to the destination exchange (Dex) 8 associated with that B-number (assuming again that the SSP 7 is directly connected to that destination exchange 8 as illustrated in FIG. 1) in order to establish a traffic channel between the SSP 7 and the destination exchange 8. The IAM may be modified by the SSP 7 prior to it being forwarded to the exchange 8; typically, the ReqCI flag (see below) is reset to prevent subsequent nodes from attempting to return charging information to the SSP 7.

In order to confirm channel allocation, the destination exchange 8 returns to the SSP 7, a so-called Address Complete Message. The ACM is then relayed (modified as described below) by the SSP 7 to the VMSC 5 to confirm that the end-to-end connection is now established.

Knowledge of the tariff rate associated with the requested IN service is held by the SCP 9. In order to propagate this information to the VMSC 5, the IAM sent from the VMSC 5 to the SSP 7 during the setp-up phase contains a Charging Plan (CHP) parameter and a new parameter referred to here as a Request for Charging Information (ReqCI) parameter. The CHP is a parameter assigned to the calling subscriber which identifies the way in which the subscriber should be treated from the charging point of view, e.g. "standard plan", "low call plan", etc. The ReqCI parameter is a flag (use may be made of one of the special forward call indicator bits of the IAM) which, when set, notifies the SSP 7 that it should obtain tariff information from the SCP 9 and return this to the VMSC.

It is important to note that the VMSC 5 contains intelligence which recognizes the call as the IN call—i.e. meaning that, whilst the VMSC 5 remains the charging point, the charge determination point lies outside the mobile network—and consequently sets the ReqCI flag in the IAM. Recognition is made by determining whether or not the B-number belongs to an IN number series.

It has already been mentioned above that the SSP 7 communicates with the SCP 9 via an ETSI CS1 based interface (see in particular TTC JT-Q1218 and JTQ1218B). More particularly, the SSP 7 requests information on the requested IN service by sending an Initial Detection Point (InitialDP) message to the SCP 9 upon receipt of the IAM. The InitialDP message contains a Service Key determined by the SSP 7 and which identifies the requested IN service. The detection of the ReqCI parameter in the IAM causes the SSP 7 to include also in the InitialDP message a request for tariff information. This request consists of an extension field termed a Flexible Charging Indicator (FCI).

When the SCP 9 identifies that the FCI flag is set, if Flexible Charging applies to the IN service, a Tariff Indicator (TI) parameter is identified and transmitted from the SCP 9 to the SSP 7 as part of a SendChargingInformation (SCI) message. The TI parameter identifies the tariff rate associated with the IN service and is held by the SSP 7 until a Flexible Charging Request Indicator (FCRI) flag is set and subsequently transmitted from the SCP 9 to the SSP 7 as an extension field of a Connect message (or of a ConnectToResource or EstablishTemporaryConnection message).

Included in the IAM sent from the VMSC 5 to the SSP 7 is a parameter which identifies the location of the originating mobile telephone 1. This parameter is known as the Originating Charging Area (OCA). Included in the ACM message returned to the SSP 7 by the destination exchange 8 is a corresponding Terminating Charging Area (TCA) parameter. Both the OCA and TCA parameters are used by the SSP 7, in combination with the TI received from the SCP 9 and the CHP, to determine a parameter referred to as Charge Information (CI). The CI parameter is transmitted in the ACM message (or alternatively in an early ACM) sent by the SSP 7 to the VMSC 5 and provides a unit rate indicator (e.g. 10 or 100 Yen), a charge rate information category, and the charge rate information itself (i.e. tariffs).

It is noted that the ACM returned to the VMSC 5 contains a further parameter referred to as Charging Information Type (CIT). This parameter indicates whether or not the CI parameter provides flexible charging information and is used by the VMSC 5 to indicate whether the ACM contains a CI parameter which should be extracted.

Reference should be made to the signalling diagram of FIG. 2 which summarizes the set-up phase signalling process in the system of FIG. 1.

It will be appreciated by the skilled person that various modifications may be made to the above described embodiment without departing from the scope of the present invention. For example, if the TCI is received by the SSP 7 after the ACM has been sent, the Charge Information may be sent in a CHG message (assuming that a Charge Information Delay flag was set in the eACM). It is also noted that the ReqCI flag may be included in a segmentation message (SGM), following an IAM message, providing that the SGM is flagged in the IAM. Alternatively, the ReqCI flag may be included in an Application Transport Parameter (APP) according to the so-called Application Transport Mechanism (APM).

It will also be appreciated that whilst the invention has been illustrated above with a system in which the IAM VMSC 5 is connected directly to the IN service SSP 7, and the IN service SSP 7 is connected directly to the destination exchange 8, connection in one or both cases may be via one or more intermediate exchanges/nodes.

It is also noted that sending of the ReqCI flag in the IAM by the VMSC may be triggered on the basis of the calling subscriber A-number rather than the destination B-number. In this case, for example, the VMSC may inspect a Home Location Register (HLR) to determine whether or not the caller's A-number is associated with an IN service and hence whether or not the ReqCI flag should be set.

In a modification to the embodiment described above with reference to FIGS. 1 and 2, in certain cases no ReqCI flag may be sent by the VMSC in the IAM. Rather, tariff information may be automatically returned to the VMSC from any external charge determination point. In this case, the VMSC decides, on the basis of the A-number and/or the B-number, whether to make use of any received tariff information or to discard that information.

We claim:

1. A method of determining charging information at a mobile switching centre of a mobile telecommunications network in respect of a call initiated by a mobile terminal registered with the network and terminating outside of the mobile switching centre, the method comprising, at the mobile switching centre:

classifying said call according to the associated A-number and/or the B-number as corresponding either to a call for which the mobile switching centre is to be the charge determination point or to a call for which an external node is to be the charge determination point;

in the event that the call belongs to the latter class, receiving tariff information from the external charge determination point and calculating charge information on the basis of the received tariff information; and in the event that the call belongs to the former class, disregarding any tariff information received from an external charge determination point and calculating charge information on the basis of the mobile telecommunications network's own tariff information.

2. A method according to claim 1, wherein, in the event that the call belongs to the class for which the charge determination point is located outside of the mobile switching centre, a Request for Charge Information is sent by the mobile switching centre to the external charge determination point.

3. A method according to claim 2, wherein said Request for Charge Information is sent as a flag contained in an Initial Address Message, transmitted as part of the call set-up phase.

4. A method according to claim 1, wherein said tariff information comprises a Charge Information (CI) parameter, giving one or more call unit rates, and a Charge Information Type (CIT) parameter, indicating whether or not the CI parameter provides flexible charging information.

5. A method according to claim 1, wherein the class of calls for which the charge determination point is located outside of the mobile switching centre, includes calls having A or B-numbers associated with Intelligent Network Services.

6. A method according to claim 5, the method comprising the steps of:
   directing a request for access to the Intelligent Network service from the mobile switching centre to a service switching point of the system, together with a request for charging information, both of said requests being contained within an Initial Address Message sent as part of a call set-up routine;
   in response to receipt of said Initial Address Message containing said request for charging information at the service switching point, sending a charging indicator request from the service switching point to a service control point having knowledge of the requested service;
   in response to receipt of said charging indicator request at the service control point, sending a tariff indicator associated with the requested service from the service control point to the service switching point; and
   determining at the service switching point, charging parameters on the basis of at least the received tariff indicator, and sending said charging parameters to said mobile switching centre.

7. A method according to claim 6, wherein said charging parameters are sent from the service switching point to the mobile switching centre during the call set-up routine.

8. A method according to claim 6, wherein said charging parameters are included in an address complete message.

9. A method according to claim 6, wherein the charging parameters determined at the service switching point are a charge information parameter and a charge information type parameter.

10. A method according to claim 6, wherein communications between the service switching point and the service control point are based upon the ETSI CS1 protocol, and said charging indicator request is sent from the service switching point to the service control point as a flexible charging indicator parameter contained in an InitialDP message and the tariff indicator is returned in response as a parameter contained within the SCI message.

11. A method according to claim 10 when appended to claim 6, wherein determination of said charging parameters at the service switching point is triggered by the subsequent receipt thereat of a message, sent from the service control point, containing a flexible charge request indicator.

12. Apparatus for determining charging information at a mobile switching centre of a mobile telecommunications network in respect of a call initiated by a mobile terminal registered with the network and terminating outside of the network, the apparatus comprising, at the mobile switching centre:
   classification means for classifying said call according to the associated A-number and/or the B-number as corresponding either to a call for which the mobile switching centre is to be the charge determination point or to a call for which the charge determination point is located outside of the mobile telecommunications network;
   first processing means arranged, in the event that the call belongs to the latter class, to receive tariff information from the external charge determination point and calculating charge information on the basis of the received tariff information, or, in the event that the call belongs to the former class, to disregard any tariff information received from an external charge determination point and to calculate charge information on the basis of the mobile telecommunications network's own tariff information.

* * * * *